United States Patent [19]

Aoki

[11] Patent Number: 4,830,811
[45] Date of Patent: May 16, 1989

[54] PROCESS FOR MOLDING DOUBLE-LAYERED PREFORMS IN AN INJECTION, STRETCHING AND BLOW MOLDING MACHINE

[76] Inventor: Katashi Aoki, 6037 Ohazaminamijo, Sakaki-machi, Hanishina-gun, Nagano-ken, Japan

[21] Appl. No.: 118,475

[22] Filed: Nov. 9, 1987

Related U.S. Application Data

[60] Division of Ser. No. 901,607, Aug. 29, 1986, Pat. No. 4,744,742, which is a continuation of Ser. No. 563,830, Dec. 21, 1983, abandoned.

[30] Foreign Application Priority Data

Dec. 28, 1982 [JP]  Japan ................................ 57-228275

[51] Int. Cl.$^4$ ............................................. B29C 45/16
[52] U.S. Cl. .................... 264/513; 264/535; 264/537; 264/538
[58] Field of Search ............... 264/538, 513, 537, 535; 425/126.1, 112, 129.1, 523, 533, 534, 540, 577, 588

[56] References Cited

U.S. PATENT DOCUMENTS

| | | | |
|---|---|---|---|
| 3,850,562 | 11/1974 | Takenghi et al. | 425/526 |
| 4,105,391 | 8/1978 | Aoki | 425/540 |
| 4,321,029 | 3/1982 | Aoki | 264/513 |
| 4,422,843 | 12/1983 | Aoki | 425/526 |
| 4,457,689 | 7/1984 | Aoki | 264/538 |

Primary Examiner—Hubert Lorin
Attorney, Agent, or Firm—Louis Weinstein

[57] ABSTRACT

A method for molding double-layered preforms in an injection, stretching and blow molding machine. Plastic material is injected into a cavity formed by a mated inner preform and core mold and into another cavity formed by a mated outer preform, neck mold and a core mold carrying an inner preform to form respectively inner and outer preforms. The inner core mold is lifted, while carrying an inner preform, and moved over the outer preform mold. The outer core mold is lifted and the neck mold strips the double-layer preform formed by the injection of the outer preform onto the inner preform. The neck mold carrying the double-layer preform is moved away from alignment with the outer preform mold and advances the preform to heating, stretching and blow molding stages. Another neck mold is moved into alignment with the outer preform mold prior to lowering the core mold carrying the inner preform into the outer preform mold. Simultaneous to lowering the core mold into the outer preform mold, the previously stripped core mold is lowered into the inner preform mold and plastic material is injected into the respective cavities.

4 Claims, 6 Drawing Sheets

PROCESS FOR MOLDING DOUBLE-LAYERED PREFORMS IN AN INJECTION, STRETCHING AND BLOW MOLDING MACHINE

This is a division of application Ser. No. 901,607, filed Aug. 29, 1986, now U.S. Pat. No. 4,744,742, which is a continuation of application Ser. No. 563,830, filed Dec. 21, 1983, now abandoned

BACKGROUND OF THE INVENTION

In a molder, for example, a molder disclosed in U.S. Pat. No. 4,105,391, wherein a plurality of neck molds are mounted at given intervals at the undersurface of a transferring platen, the neck molds and injection molds are closed, injection cores are inserted, molten resin is injected towards the inside of the neck molds to mold a preform with a bottom around the injection cores, and thereafter the injection cores are removed and transferred together with the neck molds to the succeeding step after the preform has been opened. If the injection molding stage is expanded into the range including stopping positions of two neck molds and the injection molds for molding an inner layer and an outer layer of the preform with a bottom are disposed on the neck molds, as described in U.S. Pat. No. 4,321,029, the inner layer preform and the outer layer preform can be injection molded continuously, and the double-layered preform can be transported to the succeeding step in the state without being modified.

However, in the molder which transfers the preform while being held by the neck mold, the molten resin is poured to the inside of the neck mold to mold the inner layer preform first. Therefore, in the next step of molding the outer layer preform, a space for receiving the poured molten resin cannot be formed between the neck mold and the inner layer preform without modification, and the outer layer preform molded therein is in the range molded by the injection mold. Thus, another means has to be used to mold a double-layered preform 1, that is, a preform in which an inner layer 2 and an outer layer 3 are formed up to a neck portion, as shown in FIG. 1.

The necessity of double-layered containers such as bottles for beverages is increasing with the wide use of synthetic resin containers. Particularly, in double-layered containers with an inner layer formed of polyethylene-terephthalate which is liable to give rise to thermal deformation when a filling temperature of content exceeds 80° C., if the neck portion is formed by the inner layer alone, even if the outer layer is formed of polycarbonate of excellent heat resistance, the neck position undergoes thermal deformation at the time of filling to break a seal of a lip portion, failing to serve as a container. However, if the neck portion is formed on both inner and outer layers, deformation of the neck portion can be prevented by polycarbonate of the outer layer.

SUMMARY OF THE INVENTION

The present invention provides an apparatus which can injection mold a double-layered preform having the above-described construction shown in FIG. 1 by adding to the injection molding stage a mold for molding an inner layer preform without changing the structure of the conventional molding machine.

The molder in accordance with the present invention is characterized in that clamping devices are provided internally and externally of a transferring platen on the side of a machine base. The transferring platen includes a plurality of neck molds which rotate and each neck mold stops at a position within the injection molding stage. A first mold closed with an injection core externally of the transferring platen to mold an inner layer preform in the circumference of the injection core and a second mold closed with the injection core having a neck mold and an inner layer preform to mold an outer layer preform in the whole circumference of the inner layer preform are provided, parallel to each other on a clamping plate of the clamping device, and a hydraulically-operated core mold clamping device comprising a rotary plate and a lifting plate for alternately inserting the injection cores into both of the molds from the top.

In the present invention, the clamping devices provided with the two sets of molds and the core mold clamping device are opened and closed in the state where the transferring platen stops and during the time the neck molds are positioned at the injection molding stage, and replacement of the injection cores relative to the two sets of molds is effected in synchronism with the rotation of the transferring platen. Thus, in order to mold a double-layered preform in association with intermittent movement, it is necessary to simultaneously mold an inner layer parison and an outer layer parison, and therefore, at least a pair of injection cores of the same shape are mounted on the core mold clamping device. The injection core has a length sufficient to mold both inner and outer layers up to a lip portion of the preform and is projectingly provided in the center of the lower surface of a member for closing the first mold and neck mold.

In the present invention, the double-layered preform can be molded up to the lip portion similarly to the case where a single layer preform is injection molded. In addition, the molder need not be modifed in portions other than the injection molding stage and no considerable delay occurs even during the molding cycle. Moreover, as the case may be, a single layer preform having a wall-thickness of a double layer portion can be molded merely by stopping replacement of the injection core.

Furthermore, in the molder, the molds for molding the inner layer can be provided parallel to each other externally of the injection mold closed with the neck mold, and a core clamping device provided with replacing means can be merely disposed above the molds. Therefore, the molder has features in that construction and operation are not particularly complicated and the basic construction of the existing molding machine need not be changed.

DETAILED DESCRIPTION OF THE INVENTION

Specific embodiments of the present invention will now be described in detail with reference to FIGS. 2 to 6.

Figure 1:
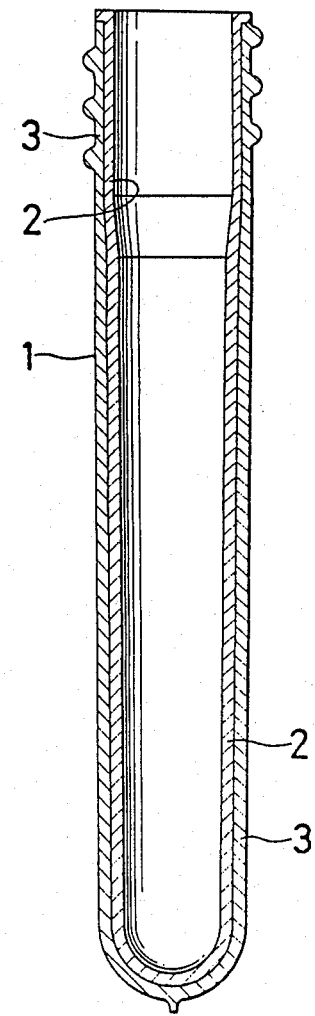
FIG. 1 is a longitudinal sectional front view of a double-layered preform which can be injection molded by a molder for molding double-layered preforms in accordance with the present invention.
Figure 2:
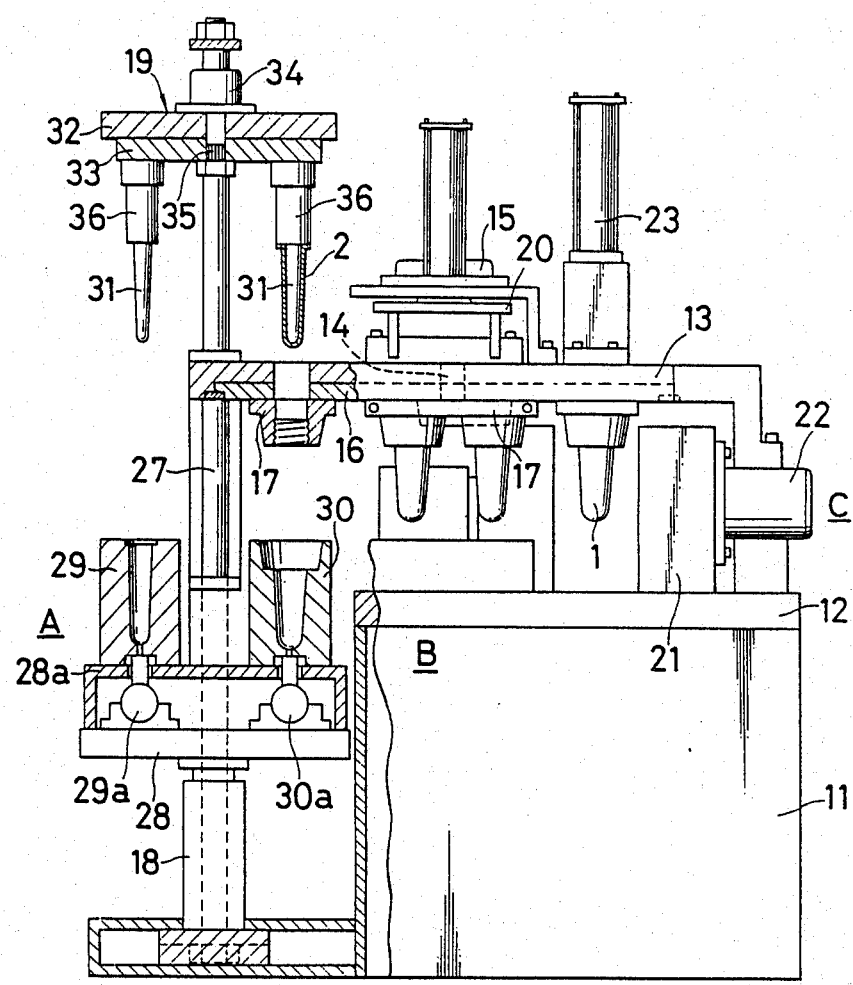
FIG. 2 is a side view of a molding machine with an injection molding stage shown in longitudinal section.

Referring to FIG. 2 and thereafter, a molder has a lower base platen 12 on a machine base 11 and an upper base platen 13 provided thereabove at a predetermined distance. The space between these base platens is the molding space.

A transferring platen 16, disposed at the undersurface of the upper base platen 13, is intermittently driven through an angle of 90° around a central support shaft 14 by means of a hydraulically or electrically-operated motor 15. Five neck molds 17 closed by springs 17a are disposed at the undersurface of the transferring platen 16 and are equidistant from one another so that they can be opened and closed when moved radially. Each neck mold 17 stops at a preform injection molding stage A, a heating stage B, a stretching and blow molding stage C, and a mold releasing stage D in said order.

In the injection molding stage A, a hydraulically-operated mold clamping device 18 and a core mold clamping device 19 are vertically arranged and in the heating stage B, a device 20 is provided to heat or cool the preform to control a preform temperature to the stretching and blow temperature.

In the stretching and blow molding stage C, a blowing mold 21, opened and closed radially by oil pressure, as well as a hydraulically operated opening and closing device 22, are provided on the lower base platen 12, and a lifting device 23 for a stretching and blowing rod is provided on the upper base platen 13. In the mold releasing stage D, a device 24 is provided for pushing open the neck mold 17 against the force of spring 17a.

The above-described devices are opened and closed or moved up and down when the transferring platen 16 stops and each of the neck molds 17 stops at a predetermined position.

Figure 3:
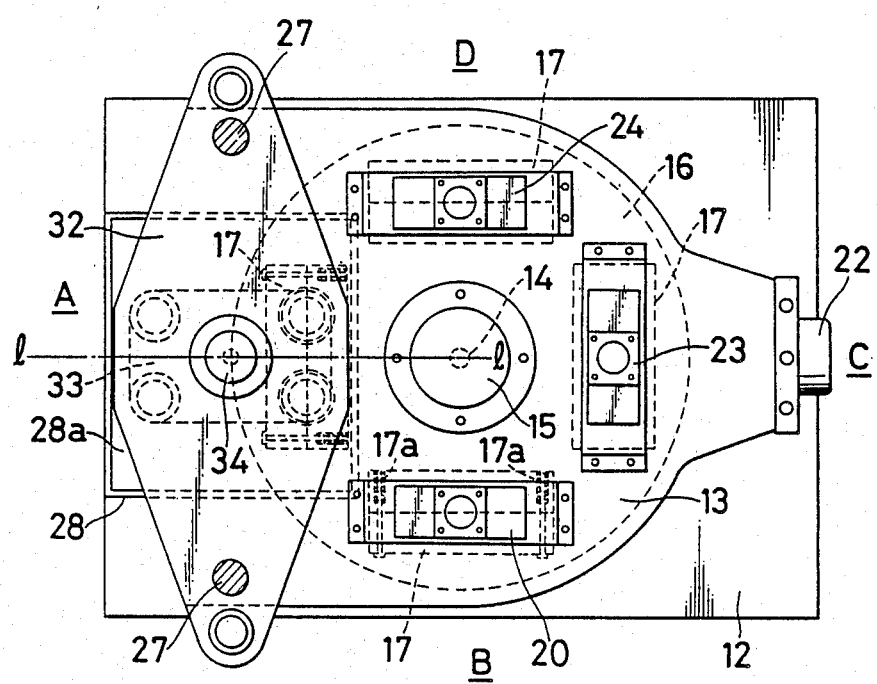
FIG. 3 is a plan view of the molding machine.
Figure 4:
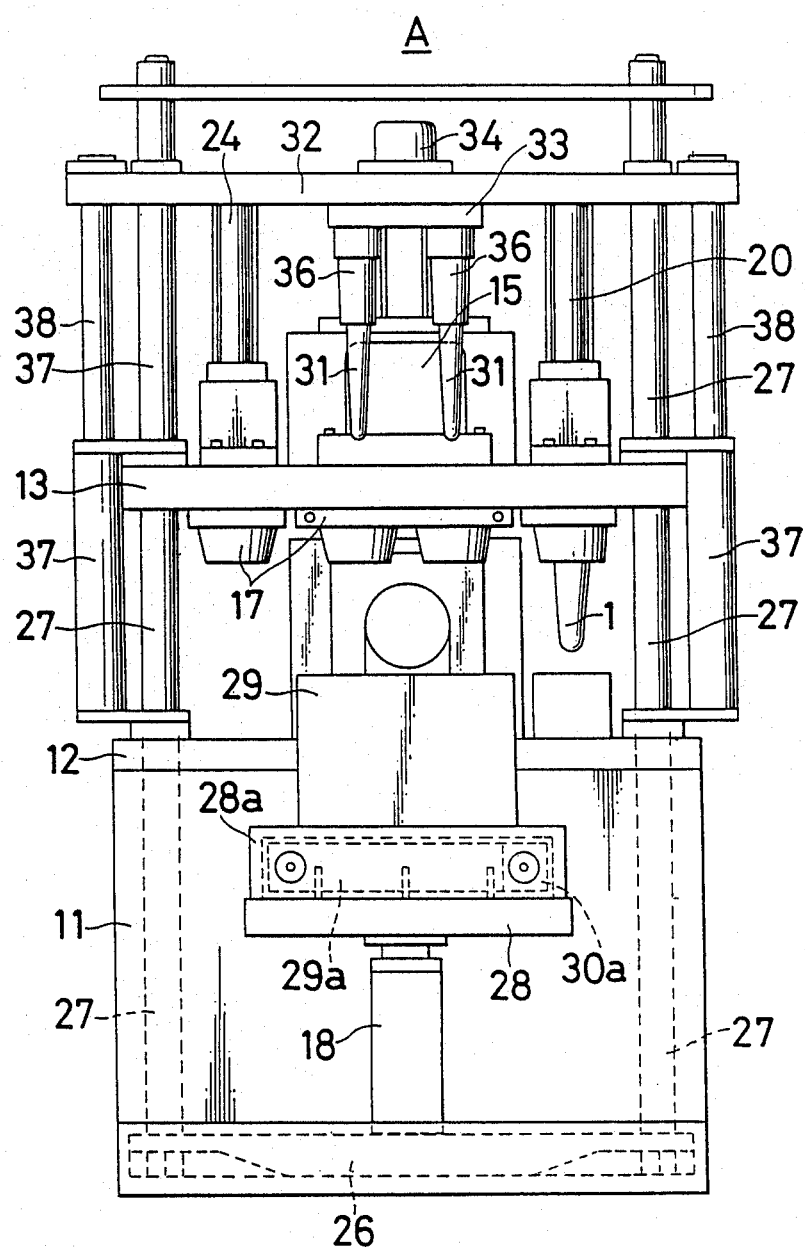
FIG. 4 is a front view of an injection molding stage of the molding machine.

The mold clamping devices 18 are provided internally and externally of the transferring platen 16 on the line 1—1 of FIG. 3 which connects the center of rotation of the transferring platen 16 and the center of the neck mold 17.

Connected to a fixed plate 26 on the side of the machine base on which the mold clamping device 18 is mounted are a pair of tie-rods 27 which serve for holding the upper base platen 13 and for supporting the upper core mold clamping device 19. On the mold clamping plate 28 provided with the mold clamping device 18 is a mold place bed 28a interiorly having two sets of hot runner blocks 29a, 30a, and two sets of molds 29, 30 are mounted parallel to one another on the mold place bed 28a. One (referred to as a first mold) 29 of said molds is positioned externally of the transferring platen 16 and the other (referred to as a second mold) 30 is mounted at a position which is close to said neck mold 17. These molds have cavities in the same number as that of the neck molds 17. The size of the cavity of the first mold 29 is sufficient to mold the inner layer preform 2 between it and the injection core 31 inserted into the mold. The size of the cavity in the second mold 30 is sufficient to form a space for receiving the injection core 31 along with the inner layer preform 2 adhered to the periphery of the core to mold the outer layer preform 3 between it and the inner layer preform 2, said space being connected to the space formed between the neck mold 17 and the inner layer preform 2.

Replacement of the injection cores 31 relative to the two sets of molds 29, 30 is effected by a rotating plate 33 at the underside of the lifting plate 32 disposed on the tie-rods 27. A rotating device 34 such as a rotary actuator on the molding clamping plate is also used for operating the rotating plate 33. The injection cores 31 are projectingly provided at the lower ends of mold beds 36, 36 at both ends of the lower surface of the rotating plate 33 connected to the rotating shaft 35, and the first mold 29 and the neck mold 17 are closed by the mold beds 36, 36. The movement of the lifting plate 32 is effected by connection of plungers 38, 38 of hydraulic cylinders 37, 37 mounted on the side of the tie-rods 27, 27.

The molding of the double-layered preform 1 by the above-described molder can be preformed without much difference from the case where the single layer preform is molded. When the transferring platen 16 stops and one of the neck molds 17 is positioned at the injection molding stage A, the first mold 29 and second mold 30 are moved up by the operation of the mold clamping device 18, and the neck mold 17 and second mold 30 are closed.

Figure 5:
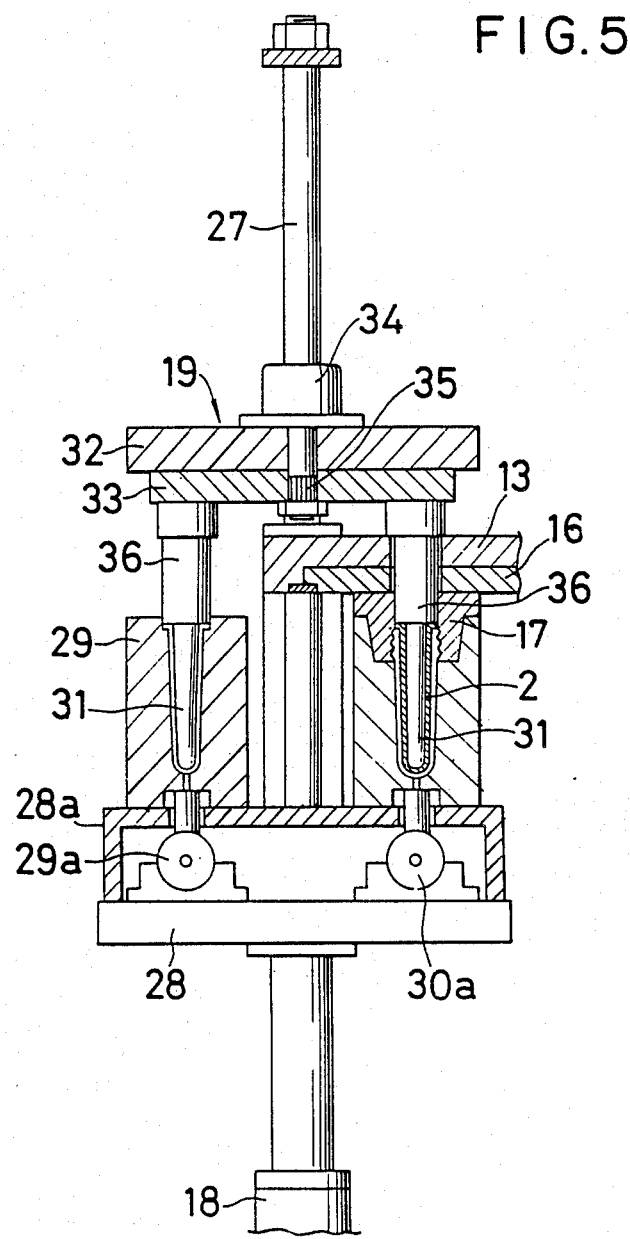
FIG. 5 is a longitudinal sectional side view of the injection molding stage with molds closed.

Next, the injection cores 31, 31 along with the mold clamping plate 32 are moved down by the operation of the core mold clamping device 19 and inserted into the first mold 29 and second mold 30, and the second mold is closed by the mold beds 36, 36, respectively. At this time, the inner layer preform 2, which is premolded in the first mold 29 by the previous step, is adhered to the periphery of one of the injection cores, and the inner layer preform 2 is positioned within the second mold extending through the neck mold 17, as shown in FIG. 5.

After powerful mold clamping has been performed following the above-described closure of molds, molten resin is poured into both molds 29, 30 from an injection device (not shown in the figure) in nozzle touch with the above-described hot runner blocks 29a, 30a.

Figure 6:
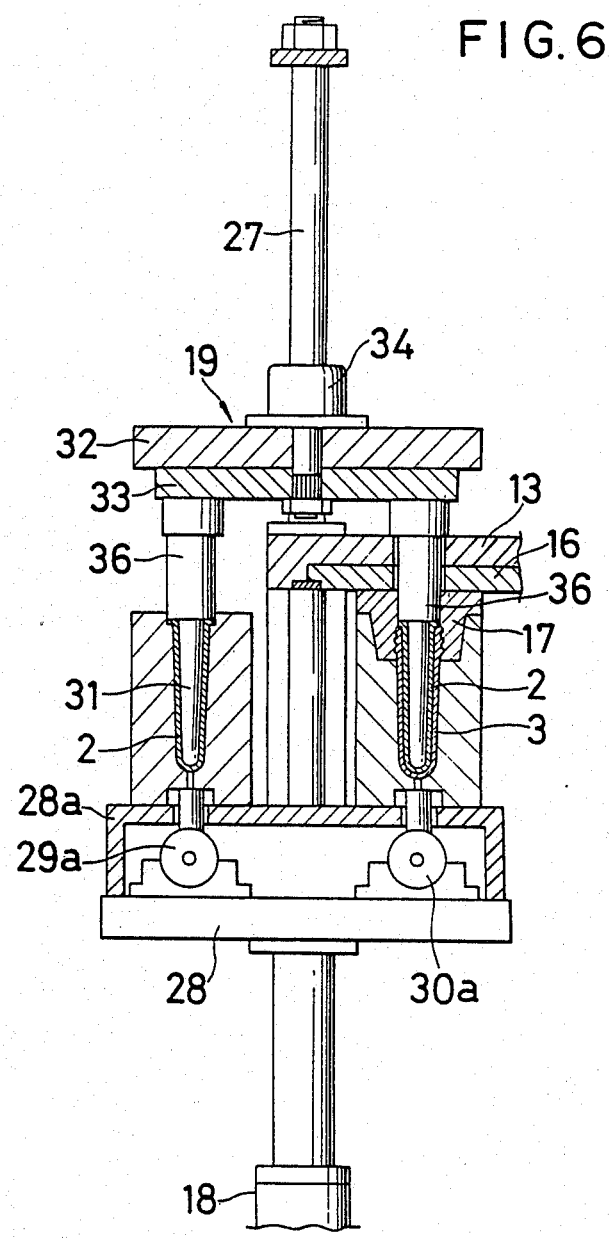
FIG. 6 is a longitudinal sectional side view of the injection molding stage wherein an inner layer preform and a double-layered preform are simultaneously injection molded.

Thereby, in the first mold 29, the aforesaid preform 2 is molded on the periphery of the injection core 31, and the outer layer preform 3 of the length reaching the inside of the neck mold 17 is formed on the periphery of the inner layer preform 2, as shown in FIG. 6.

After the preform has been injection molded, the mold clamping device 18 and the core mold clamping device 19 are operated to open both the molds 29, 30 and to raise the injection cores 31, 31. On the first mold side, the inner layer preform 2 is adhered to the periphery of the injection core 31 and removed from the first mold 29, and on the second mold side, only the injection core 31 is removed, and the molded double-layered preform 1 is held in the neck mold 17 in the hollow state and remains.

When both of the injection cores are returned to their original position, the transferring platen 16 is rotated, and the double-layered preform 1 is held by the neck mold 17 and sent to the position of the heating stage B. The rotating and driving device 34 is operated at substantially the same time as the rotation of the transferring platen 16, and the rotating plate 33 is rotated through an angle of 80° to perform the replacement of the injection cores 31, 31 to assume the state as shown in FIG. 2. When the transferring platen 16 again stops and the neck mold 17 is positioned, the molding of the inner layer preform 2 and the molding of the double-layered preform 1 are simultaneously performed. The inner layer preform 2 is not completely cooled before it is rotated into position above molding-station 30 and inserted into mold 30.

While in the above-described embodiment, the case of the molding machine provided with the heating stage B has been described, it will be noted that where the stretching and blow molding can be performed without requiring the heating, the molding machine can be used without the heating stage. The inner layer preform 2 and the outer layer preform 3 can be molded of the same or different resin, and no limitation is made particularly to such a thing in the preform molding apparatus.

What is claimed is:

1. A method for molding double-layered preforms having a top open end in an injection, stretching and blow molding machine comprising a plurality of movably mounted neck molds, an inner and outer preform mold and a pair of core molds, whereby the resulting double layer preform has a double layer neck portion extending substantially to the top, open end of the preform, said method comprising the steps of:

(a) moving a neck mold into alignment with the outer preform mold;
    (b) lowering the core molds into mating arrangement respectively with said inner preform mold and said outer preform mold and associated neck mold;
    (c) injecting a suitable plastic material into the cavity formed by the mated inner preform and core mold and into the cavity formed by the mated outer preform, neck mold and core mold to respectively form inner and outer preforms;
    (d) lifting said core molds from their previous positions whereby the core mold lifted from the inner preform mold carries said inner preform and whereby the core mold which was mated with the outer preform mold is stripped of the double-layer preform due to the associated neck mold holding the outer preform layer;
    (e) moving the core mold removed from said inner preform mold over said outer preform mold and moving the core mold previously mated with the outer preform mold and associated neck mold over the inner preform mold;
    (f) moving the neck mold holding the outer preform layer away from alignment with the outer preform mold and moving another neck mold into alignment with the outer preform mold;
    (g) lowering both of said core molds into the respective inner and outer preform molds;
    (h) injecting a suitable plastic material into the mated core mold and inner preform mold to form an inner preform and simultaneously therewith injecting a suitable plastic material into the mated outer preform mold, neck mold and core mold carrying the inner preform molded member formed during step (c) to form an outer preform about said inner preform;
    (i) lifting said core molds from said inner and outer preform molds;
    (j) lowering said inner and outer preform molds to enable the double-layer preform comprised of an inner and outer preform to be retained by the neck mold associated with the outer preform mold; and
    (k) moving said neck molds to respectively advance the double-layer preform positioned at the preform molding stage to be advanced to the heating, stretching and blow molding and release stages.

2. The method of claim 1 further comprising the step of advancing each neck mold from a release stage preparatory to forming the next double-layer preform.

3. The method of claim 1 further comprising the step of lifting said inner and outer preform molds upwardly during the lowering of said core molds to facilitate the mating of said core molds and preform molds.

4. The method of claim 3 wherein the step of lowering the core mold carrying an inner preform further comprises the step of inserting the core mold through the neck mold presently located at the outer preform molding stage; and raising the outer preform mold so that it moves into engagement with the neck mold whereby the plastic material injected into the assembled mold components form an outer preform directly upon the inner preform carried by the core member.

* * * * *

UNITED STATES PATENT AND TRADEMARK OFFICE
CERTIFICATE OF CORRECTION

PATENT NO. : 4,830,811
DATED : May 16, 1989
INVENTOR(S) : Katashi Aoki

It is certified that error appears in the above-identified patent and that said Letters Patent is hereby corrected as shown below:

At column 1, line 52, "position" should be --portion--

At column 4, line 18, "preformed" should be --performed--

At column 4, line 49, after "both" insert --of--

Signed and Sealed this

Twenty-seventh Day of November, 1990

Attest:

HARRY F. MANBECK, JR.

*Attesting Officer*  *Commissioner of Patents and Trademarks*